Oct. 13, 1964  G. WIGGERMANN  3,152,491
MECHANICAL POWER CONVERTER OF VARIABLE TRANSMISSION RATIO
Original Filed April 27, 1956  2 Sheets-Sheet 1
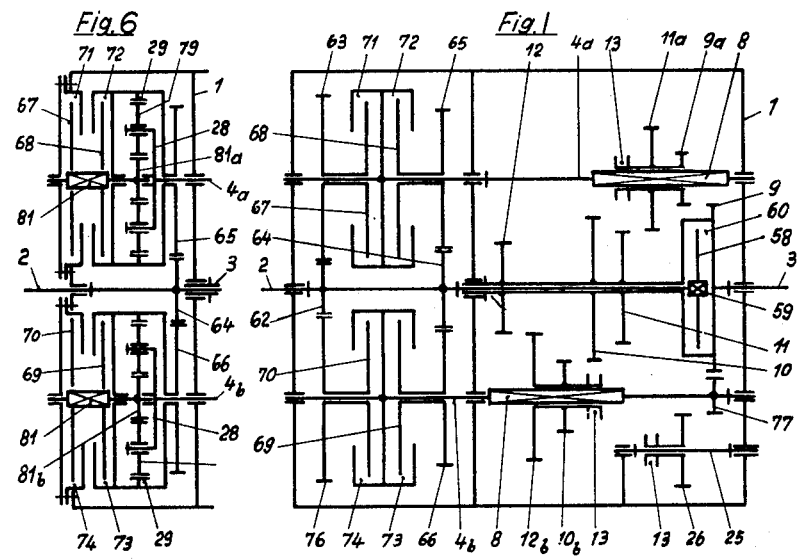
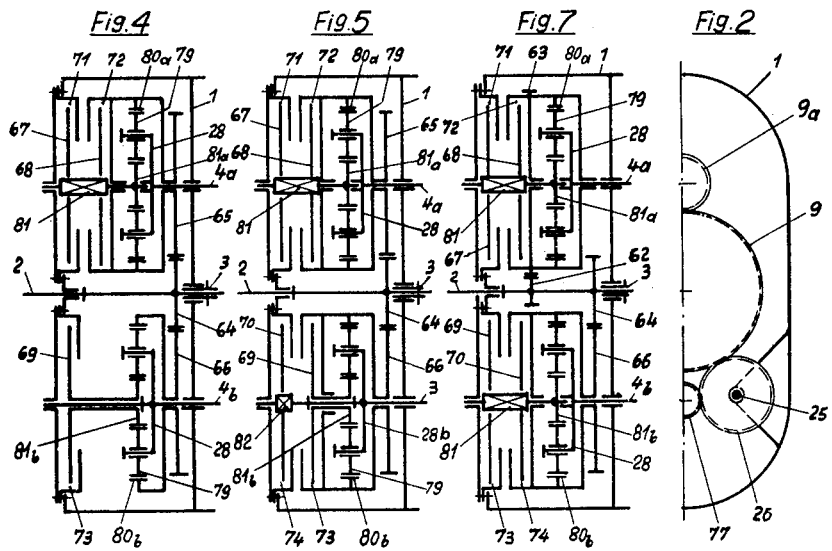

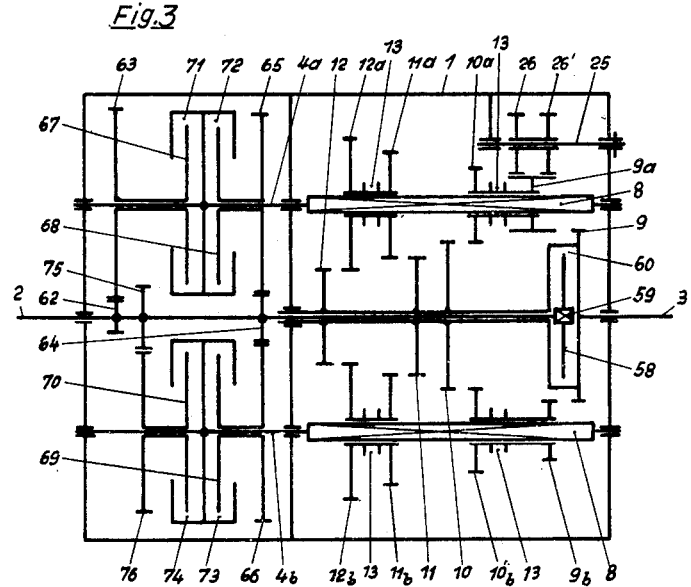

United States Patent Office 3,152,491
Patented Oct. 13, 1964

3,152,491
MECHANICAL POWER CONVERTER OF VARIABLE
TRANSMISSION RATIO
Georg Wiggermann, Kressbronn, Germany, assignor to Walter Reiners, Monchen-Gladbach, Rhineland, Germany
Original application Apr. 27, 1956, Ser. No. 581,112, now Patent No. 2,972,899, dated Feb. 28, 1961. Divided and this application Dec. 19, 1960, Ser. No. 76,982
7 Claims. (Cl. 74—740)

My invention relates to a mechanical power converter of variable transmission ratio and, more particularly, to a converter wherein a stepped speed-change mechanism of constant graduation between steps has a plurality of alternately active counter shafts driven from the converter input shaft through an auxiliary gear mechanism of continuously variable transmission ratio which permits controlling the counter shafts so that the ratio of their respective speeds varies between 1:1 and $1:c$, the value $c$ being equal to the constant graduation factor of the stepped speed-change mechanism that transmits power from the counter shafts to the output shaft of the converter. A mechanical power converter of this type is disclosed in my copending application Serial No. 529,091, filed August 18, 1955, now Patent No. 2,962,915, issued December 6, 1960.

This application is a division of my copending application Serial No. 581,112, filed April 27, 1956, now Patent No. 2,972,899, issued February 28, 1961.

A converter of this type affords reliable and smooth switching under any operating conditions and without interruption in the flow of transmitted power. By virtue of the coaction between the auxiliary mechanism and the speed-change mechanism proper and by means of the plural arrangement of counter shafts which provides for a plurality of trains of power transmission between converter input shaft and output shaft, the shifting between gear steps in the speed-change mechanism can always be performed at a counter shaft that does not transmit power at that time and the spur gears then being placed into meshing engagement are already "synchronized" to run at the same peripheral speed. Such a gear-shifting operation, occurring with synchronized gear members on a mechanically not loaded counter shaft affords most reliable performance and also offers the possibility of shifting directly by means of axially displaceable gears rather than requiring the use of additional coupling or clutching elements in the speed-change mechanism proper.

A converter as disclosed in my above-mentioned copending application has the further advantage of operating as a torque converter during the intervals of gear-shifting operations. However, for many practical purposes, it is mainly desired to provide for reliable and comfortable switching between gear steps, regardless of whether or not power losses may occur during the switching intervals. For achieving this aim, it is mainly necessary to have the auxiliary mechanism secure reliable synchronism as regards the peripheral speed of the gear members about to mesh with each other, whereas it is less important or not necessary to maintain true torque-converting performance during the switching operation.

Based upon this recognition, it is an object of my present invention to provide a mechanical power converter of variable transmission ratio which affords a simpler design than the converters previously disclosed but nevertheless secures an equally reliable performance as regards smooth switching between converter steps under all occurring load conditions.

To this end, and in accordance with one of the features of the present invention, I provide the auxiliary mechanism in a converter of the above-mentioned type with a number of spur-gear drives that are actuated from the converter input shaft and I further provide controllable slip means that connect these drives with at least two counter shafts of the graduated speed-change mechanism. Relative to one or both of the counter shafts the spur-gear drives form two alternately operable power connections whose respective transmission ratios are graduated relative to each other in accordance with the same constant graduation factor $c$ as existing between the individual gear steps of the speed-change mechanism. The controllable slip means of the auxiliary mechanism are of the slippage or friction type for gradual acceleration or deceleration of the driven slip means.

According to another feature of the invention, I further provide a direct drive between converter input shaft and output shaft by means of a controllable friction means coaxially disposed between the two shafts. For best utilization of space and minimum expenditure in components, this friction means is arranged on the largest main spur gear on the output shaft of the speed-change mechanism, and the graduation of the transmission ratios obtaining between the respective steps of the speed-change transmission is such that the direct drive forms the highest-speed gear step of the entire mechanism.

In a converter according to the invention, the switching from any one gear step to the other occurs always in a train of transmission which is not under load at that time, and the counter-shaft gear next to become active is first driven up to accurate or nearly accurate peripheral synchronism with the correlated main gear on the output shaft. In order to prevent switching tooth upon tooth, the teeth of the respective gears are preferably given sufficient clearance in the direction of rotation and the lateral edges of the teeth are preferably somewhat bevelled or rounded so that the two gears can be placed into meshing engagement even when they are both running in accurate synchronism with each other.

According to another feature of the invention, the transmission ratios of the speed-change mechanism and of the auxiliary gear mechanism are so rated rleative to each other that only an approximate, but not perfect synchronism occurs. This obviates the possibility that a tooth of one gear may continuously register with a tooth of the other gear to be placed in mesh, thus excluding the possibility of appreciable shocks occurring during gear switching.

As will be explained below, a power converter according to the invention may either operate in two-cycle performance during gear shifting, or it may operate in single cycle. Relative to two-cycle converters, and according to another feature of my invention, the auxiliary gear mechanism for driving one of the counter shafts from the input shaft is provided with two alternately operable driving transmissions, where as the connection of the other counter shaft with the input shaft is effected by only one driving transmission. Relative to converters of single-cycle operation, and in accordance with another feature of my invention, I provide two alternately operable drives between each of the two counter shafts and the converter input shaft. By virtue of the double transmission between the converter input shaft and one or two counter shafts, the change in revolving speed of these counter shafts can be effected simply by alternately actuating the appertaining two friction means. This is particularly important when the friction means are active in the direct train of power transmission between input shaft and output shaft because then the use of such alternately operable means minimizes in a simple manner the occurring interruption in power flow.

Such alternately operable means or friction means must be capable of transmitting a considerable torque, and for that reason require correspondingly large dimensions. According to another feature of my invention, however, the dimensions of the friction means are reduced by applying a design which subjects these friction means to only a small portion of the total torque to be transmitted. According to this design, a planetary or other differential gearing is inserted into the driving connection between the converter input shaft and the respective counter shafts. The gearing has its carrier member, carrying the planet gears, in permanent connection with the correlated counter shaft, whereas the orbit gear is mechanically in connection with the converter input shaft, and the sun gear is selectively connectable by means of a controllable friction means either with the carrier member or with the orbit gear. When the friction means is open, the sun gear can freely revolve so that carrier member and counter shaft stand still even when the orbit gear is being driven. When closing the friction means, the rotation of the gears is arrested, the planetary gearing is locked within itself, and the counter shaft is driven by the permanently intermeshing connecting gears from the converter input shaft.

Planetary gearings are particularly favorable for varying the counter-shaft speed as required for the gear-shifting operations of the speed-change mechanism. For this purpose, according to another feature of my invention, the sun gear of the above-mentioned planetary gearings is controlled through two selectively operable friction means. One of two friction means, when effective, connects the sun gear with one of the two other members of the planetary gearing, namely with the orbit gear or the carrier member. The other friction means, when effective, connects the sun gear with the stationary converter housing. With such a design, it is only necessary to alternately actuate the two friction means for changing the transmission ratio in the auxiliary mechanism as required for the gear-switching operation. It is advantageous to have the power-transmitting planetary gearing locked within itself during most of the operative time of the converter, so that this gearing does not produce noise or frictional losses and is not subjected to wear.

For many applications, for instance when using the converter in a vehicle drive, at least one reversing gear is required. According to a further feature of my invention, reversing is provided for by having the smallest counter gear of the speed-change mechanism selectively engageable with an intermediate spur gear which simultaneously meshes with the largest main gear on the converter output shaft and is placed in operation by axial displacement. When the intermediate gear is effective, it causes the converter output shaft to revolve in the reverse direction.

It is often important, for instance in automotive vehicles, to readily permit maneuvering between forward and reverse. A converter according to the invention lends itself with particular ease to such maneuvering. To this end, during gear switching, the above-mentioned reversing mechanism is effective in cooperation with one of the two counter shafts controlled by the auxiliary gear mechanism, while at the same time the other counter shaft cooperates with the lowest-speed forward gear pair of the speed-change mechanism. By such an arrangement, any desired smooth reversal in the revolving direction of the converter output shaft can be obtained simply by alternating actuation of the friction means through which the counter shafts are being driven, without the necessity of changing any meshing engagement between the spur gear of the speed-change mechanism. That is, the reversal is effected only by virtue of the friction means so that excessive shocks and appreciable interruption in power flow are avoided.

In order to obtain a momentary standstill during gear shifting from forward to reverse or vice versa, my invention further provides means for arresting at least one of the counter shafts relative to the converter housing, by means of another friction means.

The foregoing and other objects, advantages and features of my invention will be apparent from, and will be mentioned in, the following description of the embodiments illustrated by way of example on the accompanying drawings.

FIG. 1 is a longitudinal sectional view of the converter.

FIG. 2 shows a partial cross section of the converter, the section being taken substantially in the plane of the largest main of the converter shown in FIG. 1.

FIG. 3 shows schematically a longitudinal sectional view of another converter.

FIGS. 4 to 7 illustrate in longitudinal section four respective embodiments of auxiliary gear mechanisms applicable with converters otherwise in accordance with FIGS. 1 to 3, the mechanisms of FIGS. 4 to 7 being all provided with planetary gearings.

In all illustrations, the same reference characters are used for functionally similar elements respectively. For ease of understanding and to prevent obscuring the illustrations by inessential matters, the customary gear shifting forks or gear-shift levers are not illustrated. In principle, the gear shifting can be performed by hand, although it will be understood that it is usually preferable to control the individual gear-shifting operations by means of a central control switch or master controller preferably operated automatically in accordance with a setting selected by the operator. The central control may operate with mechanical, electrical, pneumatic, hydraulic or other means, the type of operation being often dependent upon the type of friction means chosen for a particular converter.

In all illustrated embodiments, the number of selectively operable gear pairs in the speed-change portion of the converter is chosen as four. This was done for simplifying an understanding of the converters as well as the following explanations, and also in order to readily permit a comparison between any of the illustrated embodiments. For the same reason, all embodiments are shown equipped in the same manner with friction-disc means, and these are symbolically shown as having only a single friction disc, although multiple-disc friction means, magnetic friction means or any other equivalent means may be used, provided they involve a friction principle, that is, dissipate power during periods of slippage between the driven and driving members of the friction means.

It may be mentioned that, for instance when using the converter on an automotive vehicle, no clutches are required outside of the converter.

For further clarification of the following, reference may be had to the above-mentioned Patent No. 2,972,899, of which the present case is a division.

In the embodiment according to FIGS. 1 and 2, the input shaft (I-shaft) 2 is journalled in the converter housing 1 in alignment with the output shaft (O-shaft) 3 and in parallel relation to the counter shafts (C-shafts) 4a and 4b. Mounted on the squared portion 8 of C-shaft 4a are two C-gears 9a and 11a joined together to form a single unit. The corresponding portion 8 of C-shaft 4b carries the C-gears 10b and 12b which are likewise joined together to form a unit. The gear units are displaceable relative to respective shafts 4a and 4b. Mounted on the O-shaft 3 are the M-gears 9, 10, 11 and 12. These gears have downwardly graduated numbers of teeth in the sequence just given. The C-gears denoted by the same numeral as the appertaining M-gear (for instance, 9a and 9, 10b and 10) are brought into meshing engagement with the M-gear by axial displacement and form the individual steps of the speed-change mechanism.

Another spur gear 77 is firmly mounted on the C-shaft 4b in the plane of the largest M-gear 9. Journalled in the converter housing 1 is further a shaft 25 on which a spur gear 26 is revolvably mounted and axially displaceable so that it can simultaneously mesh with M-gear 9 and spur gear 77 (see FIG. 2) and can thus serve as an intermediate gear for the reversing step. A clutch 60 serves to provide for direct drive between I-shaft 2 and a portion of O-shaft 3 and is joined with the largest M-gear 9. O-shaft 3 is hollow. I-shaft 2 passes through the hollow portion of shaft 3 and has a profiled portion 59 on which the friction disc 58 of clutch 60 is non-rotatably mounted.

All axially displaceable spur gears of the speed-change mechanism are provided with annular grooves 13 by means of which they are shifted into and out of meshing engagement by means of gear-shift fork actuated by the central controller (not illustrated) of the converter.

The auxiliary mechanism of the converter is mounted in a separate portion of the converter housing 1 and provides two separate driving connections between I-shaft 2 and C-shaft 4a. These two driving connections can alternately be switched on and off by means of friction means 71 and 72 mounted on C-shaft 4a. When one of the driving connections is in operation, the spur gear 62 on I-shaft 2 drives a spur gear 63 which is revolvably connected with the friction disc 67 of friction means 71. When the other driving connection is in operation, another spur gear 64 on I-shaft 2 drives a spur gear 65 which is revolvably journalled on C-shaft 4a and is non-rotatably joined with the disc 68 of friction means 72.

Two alternately operable driving connections are also provided between I-shaft 2 and C-shaft 4b, the selective control being effected by two friction means or controllable slip means 73 and 74 secured to the C-shaft 4b. When one of these driving connections is in operation, the gear 62 drives a spur gear 76 which is revolvably mounted on C-shaft 4b and is non-rotatably joined with the friction disc 70 of controllable slip means 74. When the other driving connection is effective, the gear 64 drives a spur gear 66 which is revolvable on C-shaft 4b and is non-rotatably connected with the friction disc 69 of controllable slip means 73. The transmission ratios of the two gear pairs of which the spur gear 62 forms part are equal to each other. This also applies to the two gear pairs which have the gear 64 in common. In contrast thereto, the transmission ratios involving the spur gear 62 are related to those involving the spur gear 64 in accordance with the ratio $1:c$, wherein the value $c$ is identical with the constant $c$ of the geometrical series of the respective transmission ratios between the sequential gear steps of the speed-change mechanism.

The operation of the converter according to FIGS. 1 and 2 will be explained with reference to switching problems presented below in tabulated form.

(A) *Switching From Idling Through All Gear Steps to Direct Drive*

Starting condition: All C-gears are disengaged (out) as shown in FIG. 1. All friction means are open. I-shaft 2 is driven. C-gear 9a is "in" (i.e. in meshing engagement with M-gear 9).

| | |
|---|---|
| (9a in; close clutch 72) | 1st step. |
| 72–92 (10 in, synchronized by 74) | 2nd step. |
| 73–10b (9a out, 11a in, synchronized by 71) | 3rd step. |
| 72–11a (10b out, 12b in, synchronized by 74) | 4th step. |
| 73–12b (11a out) | 5th step. |
| 60 | Direct drive, 6th step. |

(B) *Switching From Direct Drive Through All Gear Steps to Idling*

| | |
|---|---|
| 60 | 6th step. |
| 73–12b | 5th step. |
| 74–12b (11a in, synchronized by 72) | 4th step. |
| 71–11a (12b out, 10b in, synchronized by 73) | 3rd step. |
| 74–10b (11a, 9a in, synchronized by 72 engaged) | 2nd step. |
| 71–9a (10b out) | 1st step. |
| 9a out | Idling. |

It is apparent from Tables A and B that this converter, in contrast to the one according to FIGS. 1 and 2 of parent case, Patent No. 2,972,899, completes a gear change in each individual cycle. Consequently, this converter has single-cycle operation. It appears from FIG. 1 of this case that this converter requires a smaller expenditure in structural components than the converter according to FIG. 1 of said parent case. That is, the converter of FIG. 1 of this case has three spur gears less and can be given considerably shorter lengths of the profiled portions 8 on the C-shafts. Nevertheless, with respect to ease of switching between gear steps, the simplified converter possesses the same advantageous properties as the one described with reference to FIGS. 1 and 2 of said parent case.

In a converter of the type shown in FIGS. 1 and 2 herein, the number of gear steps can be increased or decreased as desired without changing the operating principle of basic design. Each M-gear with the mating C-gear represents one of the graduated steps of the speed-change mechanism.

(C) *Switching Between Forward and Reverse*

Spur gear 26 is to be shifted into mesh with M-gear 9 and spur gear 77 (FIG. 2); C-gear 9a is shifted into M-gear 9.

With this setting of the mechanism, the selective actuation of the controllable slip means 71, 72, 73 and 74 permits operating with two forward gear steps and two reversing steps.

In the embodiment of FIG. 3, the speed-change portion of the converter, located in the right-hand compartment of the housing 1, corresponds exactly to the corresponding mechanism portion in FIG. 1 of said parent case with the only exception of an added C-gear 12b. Consequently, the description of FIG. 1 of said parent case is applicable to the corresponding portion of FIG. 3 of this case. In FIG. 3, the auxiliary mechanism, located in the left-hand portion of the converter housing, is similar to the corresponding mechanism in FIG. 1 of said parent case in possessing for each C-shaft two separate driving connections alternately operable by means of friction means. The driving connections are similar to those shown in FIG. 3 of this case with the exception of an additional spur gear 75 fixed on I-shaft 2 and meshing with the spur gear 76 of clutch 74. An essential difference from the converters previously described concerns the transmission ratios of the spur-gear pairs in the auxiliary mechanism. These transmission ratios are as follows:

The transmission of the spur gears 62/63 is related to that of the gears 64/65 in accordance with the ratio $1:\sqrt{c}$; the transmission of gears 64/65 is related to that of gear 64/66 in the ratio of 1:1; the transmission of gears 64/66 is related to that of gears 75/76 in accordance with $1:\sqrt{c}$. Consequently, the transmission of gears 62/63 is related to that of gears 75/76 in accordance with the ratio of $1:(\sqrt{c})^2=1:c$.

The performance of the converter will again best be understood from the following presentation, in tabulated form, of several switching problems.

(D) *Switching From Idling Through All Gear Steps to Direct Drive*

Initial condition the same as with switching problem A above (9a in).

| | |
|---|---|
| 71–9a | 1st step. |
| 72–9a (9b in, synchronized by 73) | 2nd step. |
| 74–9b (9a out, 10a in, synchronized by 71) | 3rd step. |
| 72–10a (9b out, 10b in, synchronized by 73) | 4th step. |
| 74–10b (10a out, 11a in, synchronized by 71) | 5th step. |

72–11a (10b out, 11b in, synchronized by 73)\_ 6th step.
74–11b (11a out, 12a in, synchronized by 71)\_ 7th step.
72–12a (11b out, 12b in, synchronized by 73)\_ 8th step.
74–12b _____ 9th step.
60 _____ Direct drive, 10th step.

(E) *Switching From Direct Drive Through All Gear Steps Down to Idling*

60 _____ 10th step.
74–12b _____ 9th step.
73–12b _____ 8th step.
71–12a (12b out, 11b in, synchronized by 74)\_ 7th step.
73–11b (12a out, 11a in, synchronized by 72)\_ 6th step.
71–11a (11b out, 11b in, synchronized by 74)\_ 5th step.
73–10b (11a out, 10a in, synchronized by 72)\_ 4th step.
71–10a (10b out, 9b in, synchronized by 74)\_ 3rd step.
73–9b (10a out, 9a in, synchronized by 72)\_\_ 2nd step.
71–9a (9b out) _____ 1st step.
(9a out) _____ Idling.

As is apparent from Tables D and E, a converter according to FIG. 3 has the advantage of possessing a very large number of gear steps in comparison with the number of gears. The ten steps of transmission obtained require a number of gears only slightly larger than the number of gears in the six-step converter according to FIG. 1 of the parent case. However, even in a four-step speed-change mechanism, the type of converter according to FIG. 3 is advantageous in reducing the required expenditure in structural components.

It will further be recognized that the embodiment according to FIG. 3 operates in single-cycle operation, each switching cycle involving a complete change between gear steps. Fundamentally, a converter according to FIG. 3 is based upon the same principle as those described previously so that essentially the same conditions obtain relative to switching operations and switching conditions, as well as the same basic advantages. For each of the embodiments described, further clutches in the train of power transmission from prime mover to load are unnecessary thus permitting a direct connection of the converter to an engine or other drive motor.

(F) *Switching Between Forward and Reverse*

C-gear 26′ is moved in.
C-gear 9b is moved in.

Simply by alternately actuating the friction means 71, 72, 73 and 74, two forward speeds and two reverse speeds are obtained.

Without departing from the fundamental operating principle, the controllable slip means of the auxiliary gear mechanism or some of them may be mounted on the I-shaft 2 with the result of reducing the torque loading of the input shaft, as a rule, down to two to three times the amount needed in the embodiments illustrated in FIGS. 1 to 3. Such a modification is satisfactory if sufficient space is available for the converter in the axial direction. This requirement cannot be satisfied in most cases so that the provision of a slip means on the C-shafts as described in the foregoing is usually preferable.

For use in cases where the torque to be transmitted is very high, the converters according to the invention may be modified in accordance with the embodiments illustrated in FIGS. 4 to 7. In these embodiments, the auxiliary gear mechanism, aside from the friction means, is provided with two planetary gearings which subject the respective friction means to only a small portion of the torque to be transmitted to the one C-shaft in power-transmitting operation at a time. This permits using slip means of the type particularly suitable for large differences in rotating speed and correspondingly smaller torques, as in the case, for instance, with electromagnetic and electro-inductive clutches or slip means. The auxiliary mechanisms illustrated in FIGS. 4 to 7 can readily be substituted for those shown in FIGS. 1 to 3. In the following description, the particular spur-gear speed-changing mechanism applicable with the auxiliary gear mechanism is indicated. The switching operations are the same as those described previously for the respective speed-changing mechanisms.

For permitting a simple and quick orientation on the basis of the illustrations and tabulations, the planetary-gear auxiliary mechanisms shown in FIGS. 4 to 7 are explained with reference to the same reference characters as used with the preceding embodiments for analogous and functionally similar components. The functional similarity and exchangeability of the two types of auxiliary mechanisms is favorable for economical manufacture of such converters. As a result, for instance, the central control means and in some cases also the converter housing are universally applicable so that the two types of converters differ from each other essentially only by the interior components of the auxiliary mechanism.

In the auxiliary mechanism of FIG. 4, the C-shaft 4a is non-rotatably connected with the carrier member 28 of a planetary gearing coaxially aligned with the shaft. The planetary gearing comprises a sun gear 81a, planet gears 79 and an orbit gear 80a. The orbit gear 80a is revolvably mounted on the C-shaft 4a and is driven from the spur gear 64 on I-shaft 2 through a spur gear 65 firmly joined with the orbit gear. The sun gear 81a is connected with the profiled portion 81 of C-shaft 4a, which portion serves to entrain the discs 67 and 68 of the controllable friction means 71 and 72 respectively. Means 72, when in operation, connects sun gear 81a with orbit gear 80a to thus lock the planetary gearing in itself. In this case, the C-shaft 4a is joined with the I-shaft 2 as if the spur gear 65 were mounted on the planetary gearing, and there is no motion within the planetary gearing. The friction means 71 when in operation connects the sun gear 81a with the converter housing, thus arresting the sun gear. Then the planetary gearing has the effect of driving the C-shaft 4a at reduced speed. The interior transmission ratios of the planetary gearing are so chosen that the alternating actuation of the friction means 71 and 72 changes the transmission of the drive in the ratio 1:c. When both friction means are inactive, the drive of the C-shaft is interrupted.

The C-shaft 4b is non-rotatably connected with the carrier member 28b of a planetary gearing coaxially aligned with shaft 4b. The planetary gearing comprises a sun gear 81b, planet gears 79 and an orbit gear 80b. A friction means 73 of the same design as the means 71 operates to connect the friction means disc 79 with the converter housing, thus arresting the disc 69 as well as the sun gear 81b rigidly connected with the disc. Under such conditions, the C-shaft 4b is driven from I-shaft 2 through the intermeshing spur gears 64/66 and through the planetary gearing with the same transmission ratio as obtained when the C-shaft 4a is driven by operation of the friction means 71. When friction means 73 is off, the drive of C-shaft 4b is interrupted.

The above-described auxiliary mechanism according to FIG. 4 can be joined with the spur-gear speed-changing mechanism according to FIG. 3, but in this case operates somewhat differently as far as the individual switching operations during a consecutive sequence of gear shifting is concerned. The individual operations of a converter combining the auxiliary mechanism of FIG. 4 with a speed-changing mechanism of FIG. 3 are as follows:

(G) *Switching From Idling to Direct Drive*

(9a in ) _____ 1st step.
71–9a _____ 2nd step.
72–9a (10b in, synchronized by 73) _____ 2nd step.
73–10b (9a out, 10a in, synchronized by 71) _____ 3rd step.
72–10a (10b out, 11b in, synchronized by 73) _____ 3rd step.

73–11b (10a out, 11a in, synchronized by 71) -- 3rd step.
72–11a (11b out, 12b in, synchronized by 73) -- 4th step.
73–12b (11a out, 12a in, synchronized by 71) -- 4th step.
72–12a (12b out) -- 5th step.
60 -- Direct drive, 6th step.

(H) *Switching From Direct Drive to Idling*

60 -- 6th step.
72–12a -- 5th step.
71–12a (12b in, synchronized by 73) -- 4th step.
73–12b (12a out, 11a in, synchronized by 72) -- 4th step.
71–11a (12b out, 11b in, synchronized by 73) -- 3rd step.
73–11b (11a out, 10a in, synchronized by 72) -- 3rd step.
71–10 (11b out, 10b in, synchronized by 73) -- 2nd step.
73–10b (10b out, 9a in, synchronized by 72) -- 2nd step.
71–9a (10b out) -- 1st step.
9b out -- Idling.

(I) *Switching Between Forward and Reverse*

Spur gear 26′ is moved into M-gear 9.
C-gear 9b is moved into M-gear 9.

By selectively actuating the friction means 71, 72 and 73, one forward speed and two reverse speeds are obtained.

As is apparent from a comparison of Tables G and I with Tables A and B, of said parent case the externally manifested operating properties of the converter according to FIG. 4 in conjunction with a speed-change mechanism according to FIG. 3 fully correspond to those of the two-cycle converter according to FIG. 1 of said parent case. There is again the possibility of braking the C-shaft 4b against the converter housing (not illustrated), for instance by providing an additional friction means between the planetary-gear carrier member and the converter housing.

The embodiment of FIG. 5 represents another example of an auxiliary gear mechanism equipped with planetary gearings.

Relative to the drive of C-shaft 4a, the embodiment of FIG. 5 is identical with that of FIG. 4. Different, however, in FIG. 5 is the drive for C-shaft 4b. The spur gear 64 drives a spur gear 66 which is rigidly connected with the orbit gear 80b and is journalled together with the orbit gear for revolution about the C-shaft 4b. The carrier member 28b of the planetary gearing is non-rotatably connected with the C-shaft 4b, and the planet gears 79 journalled on the carrier member are simultaneously in meshing engagement with the orbit gear 80b and with the sun gear 81b. The sun gear 81b is non-rotatably connected with the friction disc 69 of means 73. By means of means 73, the disc 69 can be connected with the orbit gear 80b thus locking the entire planetary gearing within itself so that then the drive of C-shaft 4b is effected as if the spur gear 66 were rigidly connected with shaft 4b. The C-shaft 4b has a squared portion 82 non-rotatably connected with the friction disc 70 of the controllable friction means 74. By operating the means 74, the C-shaft 4b can be braked or locked against the converter housing 1. The means 73 permits interrupting the drive of the C-shaft 4b.

Since the drive of the C-shaft 4b has always a single transmission ratio determined by the gear pair 64/66, the performance of the auxiliary mechanism according to FIG. 5 corresponds fully to that of the auxiliary mechanism in the converter of FIG. 1 of said parent case. Consequently, the switching performance in two-cycle operation represented by Tables A, B and C of said parent case is applicable to the embodiment last described.

In the embodiment shown in FIG. 6, the respective drives of the two C-shafts are exactly alike and correspond fundamentally to the drive for the C-shaft 4a in the embodiment of FIG. 4. Consequently, there is the possibility of selectively connecting the two sun gears 81a and 81b by operation of the respective means 71, 72 and 73, 74 either with the orbit gear 80a or 80b, or with the converter housing; and there is also the possibility of interrupting the drive of the C-shaft 4a, 4b by opening the slip means. The alternating closing of the slip means 71 and 72 or 74 and 73 has the effect that each time the transmission ratio of the drive for the C-shaft 4a changes in the ratio 1:c, this ratio being the same for both C-shafts when the two slip means 71, 74 or the slip means 72, 73 are simultaneously closed.

As regards to external operation, this auxiliary mechanism is in accordance with the one shown in FIG. 1 and can readily be substituted for the one shown in FIG. 1 to cooperate with the speed-change portion of the converter. The operation is then in accordance with the Tables A, B and C of this case, involving single-cycle performance.

In the embodiment of FIG. 7, the arrangement of the slip means and planetary gearing is exactly in accordance with FIG. 6. However, the orbit gears 80a and 80b of the two planetary gearings are driven through two different spur gears 62 and 64 of the I-shaft, the transmission of gear pairs 62/63 being related to that of gear pairs 64/66 in accordance with the ratio 1:c. By alternating actuation of the slip means 71, 72 or 73, 74, the driving transmission ratios for the respective C-shafts are changed in the ratio of $1:\sqrt{c}$.

As regards to its external performance, this auxiliary mechanism corresponds to the one shown in FIG. 3. Accordingly, it requires single-cycle switching performance and possesses the same advantage of requiring few gears for a relating large number of speed-change steps.

It will be obvious to those skilled in the art, upon a study of this disclosure, that my invention permits of various modifications and may be embodied in specific designs other than those herein particularly illustrated and described, without departing from the essential features of the invention and within the scope of the claims annexed hereto.

I claim:

1. A mechanical power converter, comprising an input shaft, an output shaft aligned with said input shaft, two counter shafts parallel to each other and to said output shaft and equally spaced from said output shaft; an auxiliary mechanism having two gear transmissions in parallel between said input shaft and at least one of said two counter shafts, and said auxiliary mechanism comprising a controllable slip means in each of said transmissions, one side of each of said slip means being connected to a respective one of said counter shafts and the other side thereof being connected to said input shaft through a respective one of said transmissions for varying the speed of each counter shaft through a range.

2. A mechanical power converter, comprising an input shaft, an output shaft, a plurality of counter shafts parallel to each other and to said output shaft; a speed-change mechanism having groups of intermeshable gears of fixed transmission-ratio graduation from speed change group to group, each group having a main gear on said output shaft and selectively operable counter gears on said respective counter shafts; an auxiliary gear mechanism connecting said input shaft with said respective counter shafts and having selectively operable gear transmissions of which two are in parallel between said input shaft and one of said counter shafts whereas a third transmission connects said input shaft with another one of said counter shafts, said third transmission having a transmission ratio equal to that of one of said parallel transmissions, and said auxiliary mechanism comprising controllable slip means in each of said three transmissions; a stationary structure on which said mechanism is mounted, one of said transmissions in said auxiliary mechanism comprising a planetary gearing having a sun-gear member and an orbit-gear member and having planet gears and a rotatable carrier member on which said planet gears are journalled, said carrier member being coaxially joined with one of said respective counter shafts, one of said two gear members being geared to said input shaft to be driven therefrom, the other of said two gear members being selectively connectable with said one gear member or with said stationary structure, and said slip means comprising two alternately operable means for connecting said other gear member with said one gear member and said other gear member with said stationary structure respectively, whereby alternate operation of said two alternately operable means causes the transmission ratio between input shaft and counter shaft to change in the ratio of said graduation and the transmission ratios of said counter shafts are equal when the corresponding two slip means in the respective transmissions are both closed.

3. In a power converter according to claim 2, one of said two parallel transmissions for each counter shaft having a first driving spur gear in common with one of the two parallel transmissions for the other converter shaft, said first spur gear being mounted on said input shaft and said two transmissions jointly including said first spur gear having equal transmission ratios, a second spur gear and a third spur gear mounted on said input shaft and forming parts of said respective two other transmissions, the transmission ratio of input shaft through second spur gear to one of said counter shafts having relative to the transmission ratio of said common spur gear the same proportion as said latter ratio to the transmission ratio of input shaft through third spur gear to the other counter shaft, and the product of the two proportions being equal to said graduation of said speed-change groups.

4. A mechanical power converter according to claim 3 comprising a stationary structure on which both said mechanisms are mounted, one of said alternately operable means comprising a controllable brake between said other gear member and said stationary structure for selectively braking and locking said other gear member relative to said structure.

5. A mechanical power converter, comprising an input shaft, an output shaft, a plurality of counter shafts parallel to each other and to said output shaft; a speed-change mechanism having groups of intermeshable gears of fixed transmission-ratio graduation from speed change group to group, each group having a main gear on said output shaft and selectively operable counter gears on said respective counter shafts; an auxiliary gear mechanism connecting said input shaft with said respective counter shafts and having selectively operable gear transmissions of which two are in parallel between said input shaft and one of said counter shafts whereas a third transmission connects said input shaft with another one of said counter shafts, said third transmission having a transmission ratio equal to that of one of said parallel transmissions, and said auxiliary mechanism comprising controllable slip means in each of said three transmissions; a stationary structure on which said mechanism is mounted, one of the transmissions between said input shaft and each of said two respective counter shafts comprising a planetary gearing having a sun-gear member and an orbit-gear member and having planet gears and a rotatable carrier member on which said planet gears are journalled, said carrier member being coaxially joined with one of said respective counter shafts, one of said two gear members being geared to said input shaft to be driven therefrom, the other of said two gear members being selectively connectable with said one gear member or with said stationary structure, and said slip means comprising two alternately operable means for connecting said other gear member with said one gear member and said other gear member with said stationary structure respectively; each of said planetary gearings between said input shaft and said two respective counter shafts having different transmission ratios respectively, said different ratios each having a proportion of $1:c$ equal to said graduation of said speed-change groups, and the corresponding ratio obtaining within the respective two planetary gearings being equal to $1:\sqrt{c}$.

6. A rotary speed-change mechanism for dividing and controlling the torque input into a power drive transmission of the type including aligned input and output shafts and a plurality of power-drive counter shafts parallel to the output shaft, said mechanism comprising a main shaft and counter shafts for connection to said input shaft and power drive counter shafts respectively, said counter shafts of said mechanism being geared to said main shaft to be driven therefrom, a plurality of selectively operable differential gear transmissions for each mechanism counter shaft, said gear transmissions being provided with meshable gear pairs of respective transmission ratios with a constant transmission-ratio graduation from gear pair to gear pair through a predetermined range, each of said gear transmissions being provided with slip means, one side of each of said slip means being connected to a respective mechanism counter shaft and the other side thereof being connected to said main shaft through a respective one of said gear pairs for continuously varying the speed of each mechanism counter shaft throughout the range of said graduation, whereby a portion of the torque from said main shaft is distributed directly to said counter shafts and said slip means carry another portion of said torque.

7. A rotary speed-change mechanism according to claim 6, including a stationary mounting structure for said mechanism, said differential gear transmissions comprising a planetary gearing and said meshable gear pairs thereof comprising the intermeshing combination of a sun-gear member, an orbit-gear member and a carrier member having planet gears journalled on the latter, said carrier member being coaxially joined with a respective one of said mechanism counter shafts, one of said two gear members being geared to said main shaft to be driven therefrom, the other of said two gear members being selectively connected with said one gear member and with said stationary structure, said slip means for each gear transmission being alternately operable for connecting said other gear member with said one gear member or said other gear member with said stationary structure respectively, whereby alternate operation of said slip means causes the transmission ratio between said main shaft and a corresponding mechanism counter shaft to change in the ratio of said graduation and whereby when the slip means in the respective planetary gear transmissions are both closed the transmission ratios of said mechanism counter shafts are equal.

References Cited in the file of this patent

UNITED STATES PATENTS

| | | |
|---|---|---|
| 2,386,540 | Compodonico | Oct. 9, 1945 |
| 2,633,753 | Compodonico | Apr. 7, 1953 |
| 2,757,557 | Hoffman | Aug. 7, 1956 |
| 2,772,582 | Gerst | Dec. 4, 1956 |